No. 643,681. Patented Feb. 20, 1900.
C. PREVET.
FOUNTAIN FOR FILTERING, UNDER PRESSURE, WATER, &c.
(Application filed June 6, 1899.)
(No Model.) 2 Sheets—Sheet 1.

Witnesses
R. Aberli
Fred Ellmoose

Inventor
Charles Prevet.
By Briesen & Knauth
his Attorneys

No. 643,681. Patented Feb. 20, 1900.
C. PREVET.
FOUNTAIN FOR FILTERING UNDER PRESSURE, WATER, &c.
(Application filed June 6, 1899.)
(No Model.) 2 Sheets—Sheet 2.
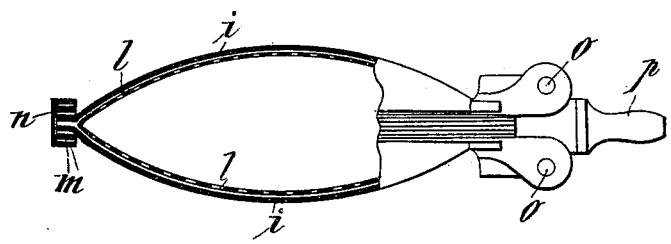
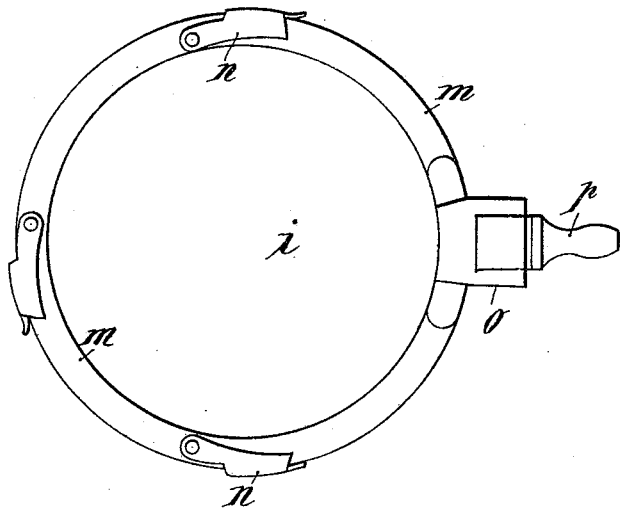
WITNESSES:
R. Aberli
Charles T. Smith
INVENTOR
Charles Prevet
BY Briesen Knauth
ATTORNEYS.

UNITED STATES PATENT OFFICE.

CHARLES PREVET, OF PARIS, FRANCE.

FOUNTAIN FOR FILTERING, UNDER PRESSURE, WATER, &c.

SPECIFICATION forming part of Letters Patent No. 643,681, dated February 20, 1900.

Application filed June 6, 1899. Serial No. 719,529. (No model.)

*To all whom it may concern:*

Be it known that I, CHARLES PREVET, of 30 Rue du Faubourg Poissonnière, in the city of Paris, Republic of France, have invented an Improved Filtering-Fountain for Filtering, Under Pressure, Water or other Liquids, of which the following is a full, clear, and exact description.

This invention relates to a stationary or transportable filtering-fountain which will filter as rapidly as if the filter were connected to a supply-pipe for water or other liquid under pressure.

This invention has for its object to provide a simple and efficient filter wherein a receiver containing water or any other liquid which it is intended to filter may be contained. At the lower part of said receiver is arranged the filter proper, and at the upper part there is a slot or opening provided with a valve, to which is secured a suitable tube, which may be connected to an air-pump for driving or compressing air or any suitable gas in the space between the level of the liquid and the upper part of the receiver. The compressed air exerting a pressure upon the liquid, the filtering will of course be accelerated according to the rate of compression of the air.

In order to be better understood, I have shown in the accompanying drawings a filtering-fountain made according to my invention.

Figure 1:
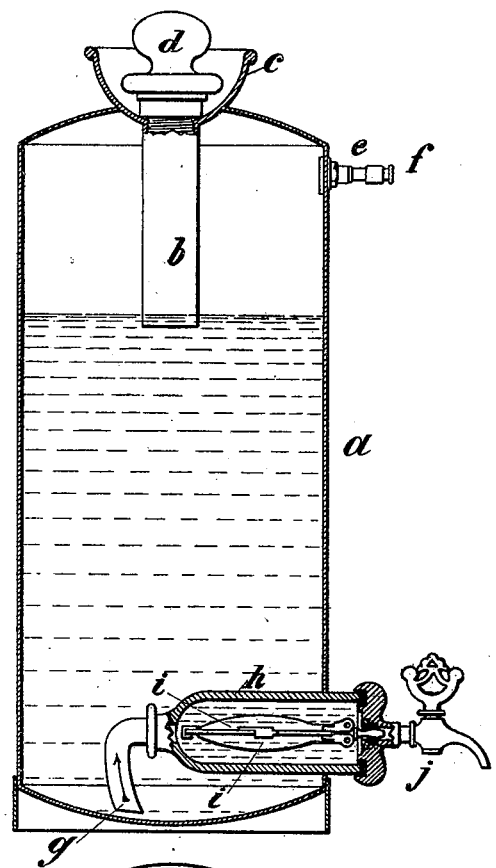
Figure 2:
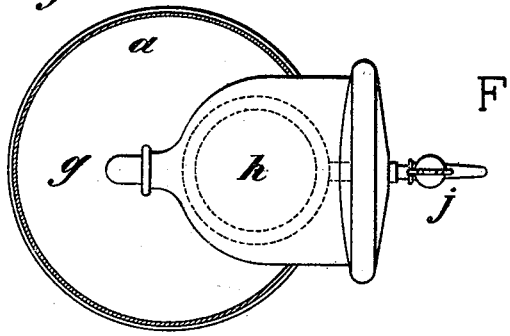

Figure 1 shows this filtering-fountain in vertical section. Fig. 2 is a horizontal section thereof. Fig. 3 is a detail side view, partly in section, of the filtering element. Fig. 4 is a plan view of the same.

In the drawings, $a$ is a receiver into which the water or other liquid to be filtered is introduced through a tube $b$, crowned with a funnel $c$, closed by a plug or stopper $d$. Toward the upper part of the receiver is a small air-inlet valve $e$, closed by a stopper $f$. In the bottom of the receiver is arranged the filter proper. Said filter, inclosed in a casing $h$, communicating with the inner part of the receiver through a pipe $g$, comprises a lens-shaped chambered disk $i$ of carbon and unsized paper secured upon opposite sides of the said disk, as specified in my former United States Patent No. 598,007, dated January 25, 1898. The nozzle of the filter ends in a draw-off cock $j$.

The filtering element is illustrated in detail in Figs. 3 and 4 of the drawings, wherein $l$ designates a foraminous chambered shell in open communication with the nozzle $p$. Supported upon opposite sides of the shell $l$ are the disks $i$ of suitable filtering-paper. These disks are secured in place by a two-part ring $m$, hinged at $o$ and adapted to be secured together by suitable clamps $n$.

In the filling operation water is preferably poured into the funnel $c$ until the pipe $b$ is submerged. There remains then an air-cushion between the level of the liquid and the upper part of the receiver. When the apparatus is required to work, an air-pump is branched upon the supply $e$, and then air is driven and compressed into the receiver. In order to get filtered water, the draw-off cock $j$ is opened, and under the pressure of the air the water then passes rapidly through the filter and is delivered in a continuous flow.

I claim—

1. An improved filtering-fountain not connected to any main or pipe for water or other liquid under pressure—comprising a receiver inclosing in its bottom the filtering device and in its top an opening with a valve, a tube provided with a funnel arranged at the upper part of the receiver for easily introducing liquid and preventing the coming out of the air filling the space between the upper part of the receiver and the level of the liquid, substantially as described.

2. An improved filtering-fountain not connected to any main or pipe for water or other liquid under pressure, comprising a receiver having at its upper part an opening with a suitable valve and a pipe with a funnel, and in its lower part a casing communicating with the inner part of the fountain and containing a filter composed of a lens-shaped chambered disk of carbon, and unsized paper secured upon opposite sides of the said disk, substantially as described and represented in the accompanying drawings.

The foregoing specification of my "Improved filtering-fountain for filtering, under pressure, water or other liquids" signed by me this 26th day of May, 1899.

CHARLES PREVET.

Witnesses:
EDWARD P. MACLEAN,
MAURICE HENRI PIGNET.